UNITED STATES PATENT OFFICE.

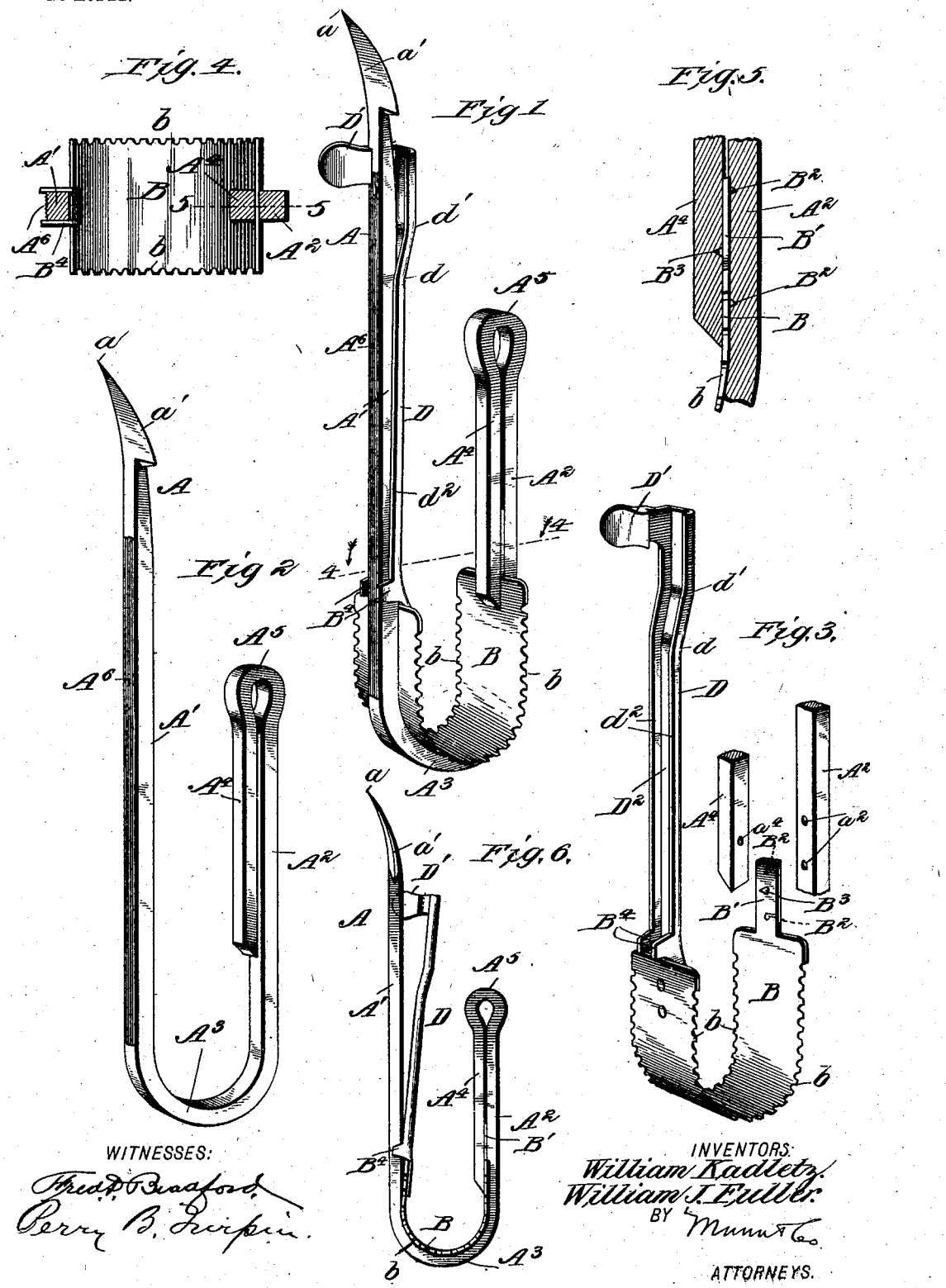

WILLIAM KADLETZ, OF LEMHI AGENCY, IDAHO, AND WILLIAM J. FULLER, OF CROWCREEK, SOUTH DAKOTA.

FISH SKINNING AND SCALING DEVICE.

SPECIFICATION forming part of Letters Patent No. 720,439, dated February 10, 1903.

Application filed August 29, 1902. Serial No. 121,471. (No model.)

*To all whom it may concern:*

Be it known that we, WILLIAM KADLETZ, a resident of Lemhi Agency, in the county of Lemhi, State of Idaho, and WILLIAM J. FULLER, a resident of Crowcreek, in the county of Buffalo, State of South Dakota, citizens of the United States, have made certain new and useful Improvements in Fish Skinning and Scaling Devices, of which the following is a specification.

Our invention is an improvement in devices for use in scaling and skinning fish; and the invention consists in certain novel constructions and combinations of parts, as will be hereinafter described and claimed.

In the drawings, Figure 1 is a perspective view of the device. Fig. 2 is a detail perspective view of the so-called "main section or holder." Fig. 3 is a detail perspective view of the clamping and skinning section. Fig. 4 is a cross-sectional view on about line 4 4 of Fig. 1. Fig. 5 is a detail sectional view on about line 5 5 of Fig. 4, and Fig. 6 is a side elevation of the device.

The holder A (shown in detail in Fig. 2) is formed with the arms $A'$ and $A^2$, united by the curved base portion or bow $A^3$, the arm $A^2$ being returned with its section $A^4$ springing toward or against the arm $A^2$, and an eye $A^5$ being provided at the juncture of the parts $A^2$ and $A^4$ by which the device may be hung up whenever desired. The parts $A^2$ and $A^4$ clamp between them the shank of the scaler B, presently described, to which end such scaler has its shank $B'$ provided with spurs $B^2$ and $B^3$, which in the position of parts shown in Figs. 1 and 6 enter sockets $a^3$ and $a^4$ in the inner sides of the parts $A^2$ and $A^4$, as will be understood from Figs. 3 and 5. By this means one end of the scaler is securely held, so that the body of the scaler will be secured within the curved or bow portion $A^3$ of the holder, as shown in Figs. 1 and 6. The arm $A'$ of the holder is provided at its upper end with a knife $a'$ for the purpose of slitting the skin of the fish, beginning at the head. In operation the fish is split down the back from head to tail, then turned over and slit from head to tail in front, so that the skin can be taken off in two pieces. The point $a$ of the knife $a'$ is to be inserted under the skin at either the tail or head part of the fish and the arm $A'$ of the holder run under the skin until the skin is down opposite and between the said arm and the clamping part of the scaler.

The scaler-section includes the scaling-plate, whose edges are toothed or serrated at E, and which is provided at one end with the shank $B'$ and has at its other end the clamping-bar D, which operates with a spring action and has at its upper end a shoulder or catch $D'$, which engages with the arm $A'$ of the holder when the parts are in the position shown in Fig. 1 and holds the clamp D and arm $A'$ snugly together. The clamp D has a main portion which extends from the scaler proper to a point $d$, near the catch $D'$, beyond which the clamp is bent outwardly at $d'$, so the catch may have a certain spring to permit it to be adjusted into and out of the position shown in Fig. 1. The body of the clamp D is channeled at $D^2$, as best shown in Fig. 3, so its side flanges or wings $d^2$ will lap on opposite sides of the arms $A'$, so to operate to secure the skin firmly between the parts D and $A'$ in the operation of skinning the fish. After the skin of the fish at one end has been inserted between the arm $A'$ and the clamp D the latter is adjusted from the position shown in Fig. 6 to that shown in Fig. 1, the catch $D'$ being thus engaged with the arm $A'$, so that the skin will be held firmly between the parts D and $A'$. By this means we furnish a handle by which the skin is securely clamped at one end and by which the skin may be drawn from the fish with one hand, while the other hand holds the fish.

The outer edge of the arm $A'$ is ground off and preferably finely grooved at $A^6$ (see Figs. 1, 2, and 4) for use as a steel in sharpening knives.

Adjacent to the juncture of the clamp D with the scaler B we provide projecting lugs $B^4$, which lap on opposite sides of the arm $A'$ of the support and brace the connection of the scaler with said support, as will be understood from Fig. 1.

It will be noticed from Figs. 1 and 4 that the scaler-plate projects on both sides of the support and can be used at either edge in scaling fish.

Having thus described our invention, what we claim as new, and desire to secure by Letters Patent, is—

1. The device herein described, consisting of the holder having opposite arms connected by the bow, and having one of said arms provided with a return portion arranged to spring toward and from its main portion, and the other arm provided at its extremity with a knife, and the scaler comprising a scaling-plate fitting in the bow of the holder and having at one end a shank arranged to be clamped by the return portion of the holder-arm and having at its other end a projecting clamping-bar channeled to fit on opposite sides of the arm of the holder and provided at its free end with a catch for engagement with said holder, substantially as set forth.

2. A device for use in skinning and scaling fish, having a scaling-plate, a spring-arm connected therewith, and a holder having an arm with which said spring-arm interlocks, substantially as set forth.

3. A fish skinner and scaler comprising the holder having a return portion, and an eye at the bend of said return portion, a scaling-plate held at one end by said return portion, and a clamp at the other end of the scaling-plate in connection with the holder, substantially as set forth.

4. A fish skinner and scaler comprising a main section or holder, a scaling-plate, and the spring-clamp connected with the scaling-plate for securing the skin of the fish to the holder, substantially as set forth.

5. A fish skinner and scaler provided with a scaling-plate and with a clamp by which to secure the skin of the fish in order to remove the latter, the clamp and plate being connected, substantially as set forth.

6. A fish skinner and scaler comprising the holder having a curved portion or bow, and the scaling-plate held in said curved portion or bow, substantially as set forth.

7. A fish skinner and scaler comprising the holder having a curved portion or bow, an arm at one end thereof and provided with a knife at its extremity, an arm at the other end of the bow and having a return portion by which to secure one end of the scaling-plate, the scaling-plate held at one end by said return portion, and a clamping-bar at the other end of the scaling-plate, and means for securing the free end of said clamping-bar in connection with the holder, substantially as set forth.

8. A device substantially as described, comprising a holder, a scaling-plate and means for securing the scaling-plate detachably in connection with the holder and including a clamp by which to secure the skin of the fish, substantially as set forth.

9. A device substantially as described, comprising a holder having a bow portion and the double-edged scaling-plate secured in said bow portion and projecting to both sides thereof, substantially as set forth.

10. A device substantially as described, comprising the holder having an upright arm, the scaling-plate, and the clamping-bar secured to the scaling-plate and channeled to fit on opposite sides of the upright bar of the holder, and means for securing said bar in clamping connection with the holder-arm, substantially as set forth.

11. A device substantially as described, comprising the holder having an upright arm formed on its outer side for use as a steel, and the scaling-plate fitted to the holder and having a clamping-bar by which it is secured in connection with said upright arm, substantially as set forth.

12. A device substantially as described, comprising the holder having a bow portion and the scaling-plate fitting in said bow portion and means whereby the opposite ends of the scaling-plate are detachably secured to the holder, substantially as set forth.

13. A device substantially as described, comprising the holder having the opposite arms, the connecting-bow, and having one of said arms returned, and the scale-plate fitting in the connecting-bow held at one end by the return portion of the holder-arm, and a clamping portion for securing the other end of the scaling-plate in connection with the other arm of the holder, substantially as set forth.

14. The combination in a fish scaling and skinning device, of a holder having an upright arm, and a scaling-plate held at one end to the holder and provided at its other end with a clamping portion by which to secure the fish-skin in removing the same, substantially as set forth.

WILLIAM KADLETZ.
WILLIAM J. FULLER.

Witnesses to the signature of William Kadletz:
FRANK M. IMMEL,
EDWIN M. YEARIAN.

Witnesses to the signature of William J. Fuller:
O. E. STUART,
W. C. MEYER.